Patented Feb. 27, 1934

1,949,229

UNITED STATES PATENT OFFICE

1,949,229

INFLEXIBLE WATERPROOF COMPOSITION AND PROCESS OF MAKING SAME

Frank William Yeager, Cliffside Park, N. J., assignor to The Barrett Company, New York, N. Y., a corporation of New Jersey No Drawing. Application April 30, 1930
Serial No. 448,776

27 Claims. (Cl. 18—47.5)

My invention relates to compositions containing bituminous material and particularly to rigid roofing materials as, for example, shingles or tiles made from such compositions and processes of making such roofing materials.

Rigid shingles and tiles and other molded products, such as tile, cement tile and cement asbestos shingles, have been manufactured for a number of years. These products are quite heavy as their chief components all have specific gravities of 2.0 to 2.5 and higher. The specific gravities of several such products now marketed were found to vary from 2.10 to 2.40. Further, because of the costly nature of the components, these products are expensive, and because of the weight of the resulting products they are not suitable for use on roof-decks of relatively light construction.

I have discovered that rigid shingles or roofing tiles of very satisfactory quality for use on moderately priced residences can be made from bituminous material and clay and in accordance with a preferred embodiment of this invention from coal tar pitch, clay and sand, with or without fibrous material. Shingles produced in accordance with this invention are waterproof, strong, hard, rigid, have lower water absorption properties than tile or the ordinary cement-asbestos or cement-sand shingles and further are much lighter in weight and hence are much more desirable for use on roof-decks of light construction such as are employed in the usual type of dwelling house construction.

One object of this invention is to provide an inflexible type of light, durable roofing element which can be cheaply and easily produced. Another object of this invention is to provide an improved method for producing molded products, such as rigid shingles or tiles. These and other objects and features of the invention will appear from the following detailed description of the same.

In accordance with my invention I mix bituminous material, such as asphalt or coal tar pitch, with clay. The term "clay" is intended to include mineral material, such as ordinary clay or tripoli, which possesses the property of plasticity when wet and which loses this property and hardens on being heated. Sand, i. e. chemically inert material preferably siliceous may be added to the mixture of bituminous material and clay and, if desired, fibrous material, such as asbestos or organic fibres, is also added. The sand and fibrous material serve to strengthen the ultimate composition. The dry ingredients are mixed with water to produce a plastic mass which is then heated to dryness. The heating or baking is continued to form a hard, inflexible, waterproof composition. Shingles or other articles may be molded or otherwise formed from the plastic mass, the molded product being dried and heated to a temperature which is high enough to diffuse the pitch throughout the mass. The articles are then allowed to cool. Instead of or in addition to the fibrous material, metallic reinforcing members such as wire, wire mesh, or sheets may be used, the plastic mass being shaped about the metallic reinforcing members so that the reinforcing members are incorporated therein.

The pitch or other bituminous material employed preferably has a melting point which is sufficiently high so that it will not be materially affected by changes in temperature to which the roof or other article will be subjected when in use. However, the melting point should not be so high that the resulting article will be brittle. Pitches having melting points between 140° F. and 320° F. and specific gravities of 1.25 to 1.30 have been found to be particularly suitable for the practice of this invention. With organic fibres preferably the softer grades of pitch are used as they are more readily and thoroughly diffused throughout the mix without overheating. With asbestos fibre filler, hard pitches are preferably used.

A satisfactory and preferred composition for the preparation of inflexible, hard, waterproof materials may be formed by admixing approximately 15 to 45 parts of bituminous material with 15 to 40 parts clay and 15 to 50 parts sand for each 100 parts of dry ingredients, i. e., bituminous material, clay, sand and fibrous material filler. The apparent specific gravity of the ultimate product resulting from the composition containing the ingredients mixed in the proportions indicated varies from approximately 1.10 to approximately 1.50. Changes in proportions within the ranges indicated above affect the physical characteristics of the ultimate product. For example, products containing approximately 15 parts bituminous material and 15 parts clay have greater water absorption tendencies than products containing approximately 40 parts clay and 45 parts bituminous material. An increase in the proportion of sand in the product increases the specific gravity thereof. I have found that in a mix containing the ingredients in the proportions hereinabove indicated, diffusion of the bituminous material throughout the mix may be accomplished by a heat treatment and a hard, inflexible, efficient, waterproof composition obtained. This may be attributed to the combined effect of the diffusion of fluid bitumen at temperatures prevailing during the heat treatment by capillary action and also the partial vaporization and subsequent condensation within the mix or composition of a certain portion of the bitumen.

In preparing these compositions it has been found very satisfactory to crush the pitch and then mix it with the other ingredients when the melting point of the pitch is sufficiently high to permit this treatment. Crushing the pitch so that the particles pass through a 20-mesh sieve has been found to produce satisfactory results. Pitches too soft for crushing are readily incorporated by emulsifying them with the clay and water.

The character of the fibre employed in such shingles seems to have a material effect upon the nature of the resulting product. The strongest shingles produced when asbestos was employed result from the use of asbestos having long fibres. However, excellent results have been obtained by the use of short fibered asbestos. Organic fibres may be employed with or without asbestos, suitable materials being animal hair, paper stock, cotton hull fibre and the like. Generally it is found that the use of organic fibre results in an article which is somewhat stronger than that produced by using asbestos fibre.

I may subject the dry ingredients to pressure or the dry ingredients may be mixed with water and then molded under pressure into shape. The preferred mix contains about 1 part water to 2.7 parts of dry ingredients before drying. Variations in the amount of water added to the dry ingredients influence the specific gravity and water absorption tendencies of the final product. The specific gravity is lowered and the tendency to absorb water is increased as more water is used in the mix. The drying of the molded product may take place at atmospheric temperature but considerable time is saved if the drying is carried out at elevated temperatures or by means of pressure during the molding operation.

As above indicated, after the plastic mass has been dried it is subjected to higher temperatures, preferably considerably in excess of the melting point of the pitch or bituminous material employed. The drying and heating or baking of the molded article can be conveniently carried out by passing the shaped mass through a furnace having heat zones which differ in temperatures, the first heat zone being maintained at the drying temperature and the second or later heat zones being maintained at higher temperatures. When organic fibres are employed the heating of the article should not be carried to such a high temperature that the organic fibres are destroyed. Ordinarily when organic fibres are employed the final heating should not be carried out at a temperature above 400° F. but when asbestos fibres are employed the temperature may be as high as 600 or 700° F. The temperature preferably should not be allowed to exceed 800° F. as above this temperature the pitch or bituminous material may change in character to such an extent that the resulting product is not quite as good as when lower temperatures are employed. The heating of the article at high temperatures will usually be sufficient if maintained for a period of about thirty minutes. However, the length of time of heat treatment and the temperature employed will depend somewhat upon the character of the fibre, the melting point of the bitumen and the proportions of water and other ingredients making up the article.

The following examples of the invention are given for purposes of illustration, but without intending to limit the invention to the specific proportions or ingredients mentioned.

*Example I.*—33 parts by weight of pitch having a melting point of about 300° F., 33 parts of clay, 17 parts of sand and 17 parts of short asbestos fibre were mixed together. One part of water was added for each 2.7 parts by weight of dry materials. The mixture was thoroughly stirred to distribute the water throughout the mass and the plastic product molded into shingles. The shaped plastic mass was dried and baked for about 30 minutes at a temperature of 600° F. The resulting product had a specific gravity of approximately 1.36, was strong and showed much lower water absorption tendencies than cement asbestos shingles. In actual tests at the end of twenty hours the composition absorbed 0.6% water. This compares with 7.5% absorption by a cement asbestos shingle tested in like manner. The weathering properties of this product are exceptionally good.

*Example II.*—The same mixture using very short fibered asbestos and 3 parts of water to 5 parts of dry ingredients was prepared and baked as before. The resulting product had a specific gravity of approximately 1.29 and was similar in appearance to the product of Example I. This product at the end of twenty hours test showed water absorption of 1.5%.

*Example III.*—A mixture containing 33 parts pitch having a melting point of 165° F., 33 parts clay, 26 parts sand and 8 parts paper stock was mixed with water. These were dried and baked at 280° F. for twenty minutes. The final product had a specific gravity of 1.25, was tough, strong and showed low water absorption tendencies.

Pressure may be applied to the molded product either before or after drying or during the baking operation although the use of pressure does not appear to be essential to the production of a light strong product having low water absorption characteristics.

The product when uncolored has a gray mottled color of attractive appearance but if desired the shingles may be ornamented by adding coloring matter such as red iron oxide to the mix before baking. The surface of the shingle or other article may be smooth or roughened or embossed with designs by simple processes before or during baking, and slate, sand or other pulverized or granular material may be pressed into the surface of the shingle. More ornate finishes may be given the product by the use of veneers, enamels or resins such as paracumarone resin. The latter has been successfully employed by brushing the resin onto the hot articles or by applying powdered material to the surface thereof while heated, producing a finish layer or veneer. Pigments may be incorporated in the resins or other materials used for forming the finish layer, thus producing desired decorative effects.

I claim:

1. A hard, inflexible, waterproof composition comprising a baked mixture of bituminous material, clay and inert material the amount of bituminous material present in the mixture being approximately equal to the amount of clay.

2. A hard, inflexible, waterproof composition comprising a baked mass consisting of coal tar pitch, clay, sand and fibrous material.

3. A hard, inflexible, waterproof composition comprising a baked mixture containing pitch initially having a melting point between 140° F. and 320° F., clay and inert material.

4. A rigid roofing element comprising a baked mixture containing at least 15 parts bituminous material, an amount of clay approximately equal to the amount of bituminous material in the mixture, and inert material.

5. A rigid roofing element comprising bituminous material, clay and metallic reinforcing member.

6. A rigid roofing element comprising a baked mixture containing from 15 to 45 parts of bituminous material, 15 to 40 parts clay and 15 to 50 parts inert material and having on at least one surface thereof a layer of colored material.

7. A rigid roofing element comprising a baked mixture of bituminous material, clay and inert material and having at least one surface thereof ornamented.

8. A rigid roofing element comprising a baked mass containing approximately 33 parts coal tar pitch having initially a melting point between 140° F. and 320° F., approximately 33 parts clay, approximately 17 parts sand and 17 parts asbestos fibre.

9. A rigid roofing element comprising approximately 33 parts pitch, clay and inert material and having on at least one surface thereof a layer of colored material.

10. The process which comprises mixing bituminous material with clay, adding water to the resultant mixture and then baking this mixture.

11. The process which comprises mixing bituminous material with clay and inert material, adding water thereto, drying the resultant plastic mixture and then baking the dried mass to form a hard, inflexible waterproof composition.

12. The process which comprises mixing bituminous material, clay and water, shaping the mass so produced and thereafter heating the mass at temperatures sufficiently high to drive off the water and to diffuse the bituminous material throughout the mass.

13. The process which comprises mixing bituminous material, clay and inert material with water, shaping the plastic mass so produced, expelling water therefrom and thereafter heating the material to a temperature sufficiently high to diffuse the bituminous material throughout the mass.

14. The process which comprises mixing bituminous material, clay and water, shaping the mass so produced around a metallic reinforcing member and thereafter heating the resulting product to temperatures sufficiently high to drive off the water and to diffuse the bituminous material throughout the mass without carbonizing the bituminous material.

15. The process which comprises mixing 15 to 45 parts bituminous material, 15 to 40 parts clay, 15 to 50 parts sand, and fibre with water, shaping the plastic mass so produced, drying the shaped mass and thereafter heating the material at a temperature between that of the melting point of the bituminous material and 800° F.

16. The process which comprises mixing bituminous material, clay and sand, forming the materials into a shaped mass under pressure and thereafter heating the mass at a temperature high enough to diffuse the bituminous material throughout the mass without carbonizing the bituminous material.

17. The method of making shingles which comprises mixing 15 to 45 parts bituminous material with 15 to 40 parts sand and 15 to 50 parts clay, adding water to the dry ingredients to form a plastic mass, forming the mass into shingles and thereafter heating the shingles so produced at a temperature high enough to diffuse the bituminous material throughout the mass.

18. The method of making shingles which comprises mixing bituminous material, clay, sand and organic fibre, adding water to the dry ingredients to form a plastic mass, forming the mass into shingles and thereafter heating the shingles so produced at a temperature sufficiently high to diffuse the bituminous material throughout the mass but below a temperature at which the vegetable fibres are destroyed.

19. The method of making shingles which comprises mixing coal tar pitch and clay with water, forming the plastic mass so produced into shingles, drying the shingles and heating the same at a temperature of about 650° F.

20. The method of making shingles which comprises mixing coal tar pitch having a melting point between 140° F. and 320° F. with clay and inert material, adding water to the dry ingredients to form the same into a plastic mass, forming the mass so produced into shingles, drying the shingles and heating the shingles at a temperature of about 650° F. for about 30 minutes.

21. The method of making molded articles which comprises mixing bituminous material in a dry state with clay, sand and fibre, adding from one to five parts of water for each two and one-half parts of dry ingredients, shaping the plastic mass and heating the shaped mass so produced.

22. The method of making molded articles which comprises mixing bituminous material in a dry state with clay, adding from one to five parts of water for each two and one-half parts of dry ingredients, shaping the plastic mass so produced and heating the shaped mass in successive stages, the last stage of heating being conducted at a higher temperature than the first.

23. The process which comprises mixing bituminous material, clay and sand, shaping the mass so produced, thereafter heating the mass at a temperature sufficiently high to diffuse the bituminous material throughout the mass, and ornamenting at least a portion of the surface of the article after the material has been shaped.

24. The process which comprises mixing 33 parts of coal tar pitch having a melting point of approximately 280° F. with 33 parts of clay, 26 parts sand and 8 parts fibre, adding one part water for every 2.7 parts of dry ingredients and thoroughly incorporating the same, forming the plastic mass so produced into shingles and heating the shingles at a temperature between 280° F. and 800° F. for about thirty minutes.

25. A hard, inflexible, waterproof composition, comprising a baked mixture containing approximately equal amounts of bituminous material and clay.

26. The process of making a hard, inflexible waterproof composition which comprises mixing bituminous material and clay and then baking the mixture to a temperature between 280° F. and 800° F.

27. The process of making a hard, inflexible waterproof composition which comprises mixing bituminous material and clay and baking the resultant mixture to a temperature such that substantially no carbonization of the bituminous material takes place.

FRANK WILLIAM YEAGER.